R. R. JONES.
Pliers.
No. 226,756.   Patented April 20, 1880.
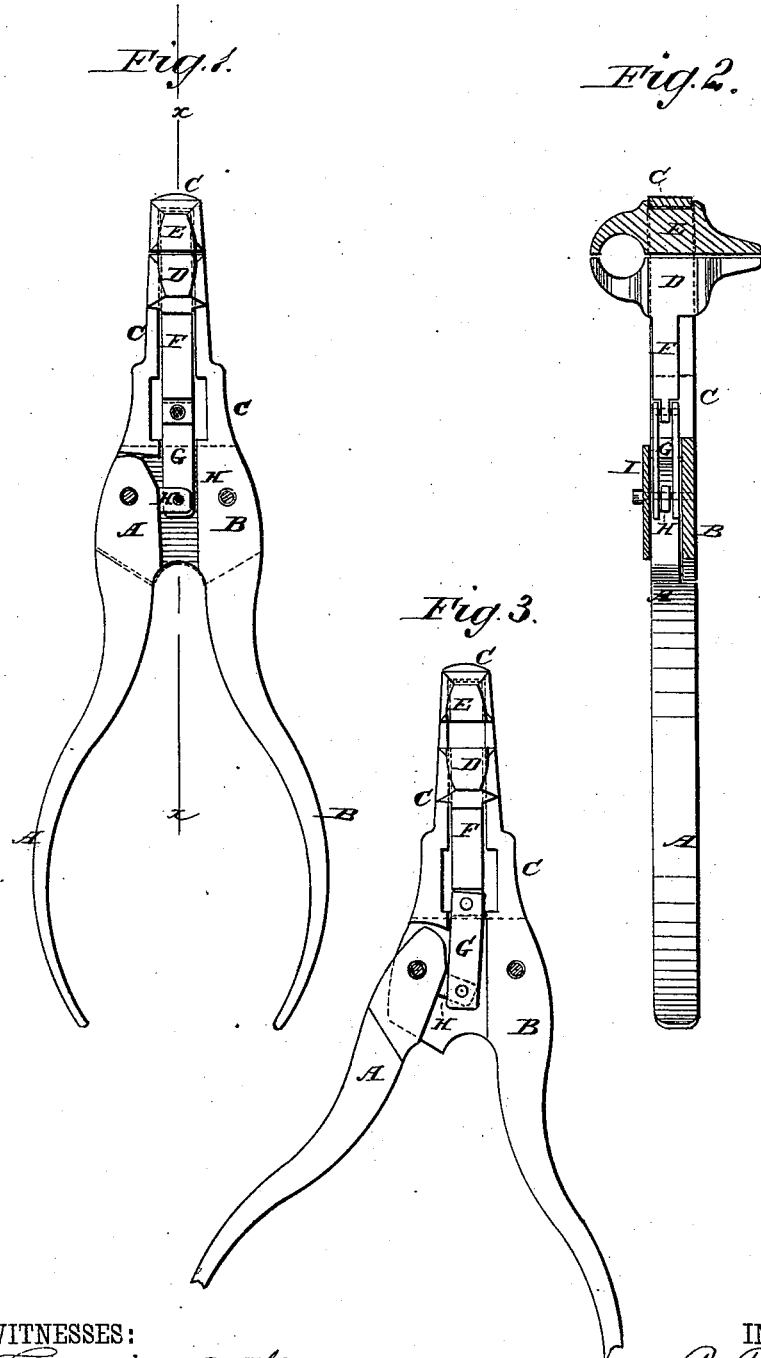
WITNESSES:
Francis McArdle.
C. Sedgwick.
INVENTOR:
R. R. Jones
BY Munn & Co
ATTORNEYS.

UNITED STATES PATENT OFFICE.

ROLLA R. JONES, OF WATERTOWN, NEW YORK.

PLIERS.

SPECIFICATION forming part of Letters Patent No. 226,756, dated April 20, 1880.

Application filed November 10, 1879.

*To all whom it may concern:*

Be it known that I, ROLLA R. JONES, of Watertown, in the county of Jefferson and State of New York, have invented a new and useful Improvement in Pliers, of which the following is a specification.

Figure 1 is a plan view of my improvement, the cap-plate being removed. Fig. 2 is a sectional side elevation taken through the line $x$ $x$, Fig. 1. Fig. 3 is a plan view, showing the heads drawn apart.

The object of this invention is to furnish pliers so constructed that they may receive different tools, and that the heads can be removed and replaced as required.

The invention consists in combining, with the frame-work and the movable heads of the tool, a stem, a connecting-bar, and a short arm, as will be hereinafter fully described, so that the heads may be moved to grasp and release the article to be operated upon by moving the pivoted handle of the frame-work.

Similar letters of reference indicate corresponding parts.

A B are the handles of the pliers, the forward part of one, B, of which is widened, is halved to receive the other handle, A, and has a slotted frame, C, formed upon its forward end. The inner part of the slot in the frame C is enlarged, so that the heads of the pliers or other tool may pass through it.

D E are the heads of the pliers, which have grooves in their sides to receive the bars of the frame C. In the drawings the heads D E are represented as having holding-jaws upon one end and cutting-jaws upon the other end. Any desired shape may be given to the heads D E, as the work to be done may require, or the heads D E may be replaced by a punch or other desired tool.

To the inner head, D, is attached, or upon it is formed, a stem, F, to the end of which is hinged the end of a short connecting-bar, G. The other end of the bar G is hinged to the end of a short arm or lug, H, formed upon or attached to the inner side of the pivoted inner end of the handle A.

The arm H and its connections with the handle A and connecting-bar G are covered, and the pivot of the handle A is strengthened by a plate, I, attached to the said pivot and to the handle B, as shown in the drawings.

With this construction, by moving the handle A outward the inner head, D, will be drawn away from the outer head, E, to receive the article to be held or operated upon, and by moving the handle A inward the article will be grasped, cut, or otherwise operated upon. With this construction, by sliding the heads D E inward to the enlarged part of the slot in the frame C, the said heads may be removed and replaced by others, as may be desired.

Having thus fully described my invention, I claim as new and desire to secure by Letters Patent—

1. The combination, with the pivoted handle A, the rigid handle B, the frame C, and the movable heads D E, of the stem F, the connecting-bar G, and the arm H, substantially as herein shown and described, so that the article to be operated upon may be grasped and released by operating the handle A, as set forth.

2. In pliers, the removable heads D E, having holding-jaws upon one side and cutting-jaws upon the other side, substantially as herein shown and described, so that the same tool can be used for different purposes, as set forth.

ROLLA R. JONES.

Witnesses:
HENRY JESS,
SAMUEL GILLINGHAM.